United States Patent [19]
Miyake et al.

[11] Patent Number: 5,942,320
[45] Date of Patent: *Aug. 24, 1999

[54] BARRIER COMPOSITE FILMS AND A METHOD FOR PRODUCING THE SAME

[75] Inventors: Ryuta Miyake, Takatsuki; Takaaki Murai, Otake, both of Japan

[73] Assignee: Daicel Chemical Industries, Ltd., Osaka, Japan

[*] Notice: This patent is subject to a terminal disclaimer.

[21] Appl. No.: 08/917,345

[22] Filed: Aug. 26, 1997

[30] Foreign Application Priority Data

Sep. 3, 1996 [JP] Japan .................................. 8-232888

[51] Int. Cl.⁶ ........................... B32B 27/32; B32B 27/34; B32B 27/36
[52] U.S. Cl. ......................... 428/216; 427/387; 428/213; 428/215; 428/336; 428/423.5; 428/423.7; 428/424.2; 428/425.5; 428/448; 428/451
[58] Field of Search .................................... 428/213, 215, 428/336, 423.5, 423.7, 424.2, 425.5, 448, 451, 216; 427/387

[56] References Cited

U.S. PATENT DOCUMENTS

| | | | |
|---|---|---|---|
| 3,656,998 | 4/1972 | Ottmann et al. | 428/422 |
| 5,279,873 | 1/1994 | Oike | 428/35.4 |
| 5,770,301 | 6/1998 | Murai et al. | 428/213 |

FOREIGN PATENT DOCUMENTS

| | | |
|---|---|---|
| 0760283A1 | 3/1997 | European Pat. Off. . |
| 63-237940 | 10/1988 | Japan . |
| 1202435 | 8/1989 | Japan . |
| 1202436 | 8/1989 | Japan . |
| 3086539 | 4/1991 | Japan . |
| 03231838 | 10/1991 | Japan . |
| 3239537 | 10/1991 | Japan . |
| 03086539 | 11/1991 | Japan . |
| 3278946 | 12/1991 | Japan . |
| 4173137 | 6/1992 | Japan . |
| 5131590 | 5/1993 | Japan . |
| B2818395 | 2/1996 | Japan . |
| 08099390 | 4/1996 | Japan . |

*Primary Examiner*—D. S. Nakarani
*Attorney, Agent, or Firm*—Birch, Stewart, Kolasch & Birch, LLP

[57] ABSTRACT

A barrier composite film comprises a base film, an anchor coat layer, an inorganic layer such as a silicon oxide layer, and a coating layer containing a silane coupling agent and a barrier resin (e.g. a vinylidene chloride-series copolymer, an ethylene-vinyl alcohol copolymer), the layers being formed on at least one side of the base film in the order of reference. The anchor coat layer can be made of (A) a chlorine-containing resin such as a vinyl chloride-vinyl acetate copolymer, (B) a polyisocyanate compound, and (C) a saturated polyester resin having a glass transition temperature of −10° C. to 20° C. and being substantially unreactive to the component (B). A heat-sealing layer may be formed on the surface of the coating layer or the other side of the base film. This composite film provided with the inorganic layer can avoid a loss of its adhesive properties and barrier properties even under severe conditions such as retort treatment.

29 Claims, No Drawings

BARRIER COMPOSITE FILMS AND A METHOD FOR PRODUCING THE SAME

FIELD OF THE INVENTION

The present invention relates to a barrier composite film which has prominent gas barrier properties against water vapour, oxygen and aromatic components and which is suitable for a film for dried food preservation, a film for retort treatment or microwave heating of food, a packaging film for pharmaceutical products and precision electronic parts, a film for production of a balloon or a hot-air balloon and a film for other applications, and a method for producing the barrier composite film.

BACKGROUND OF THE INVENTION

Conventional technologies have suggested that a barrier property of a base film can be improved to a great extent by coating the base film with an inorganic oxide thin layer. Further, a resin layer provided on the inorganic oxide thin layer imparts heat-sealing properties to the barrier film and protects the inorganic oxide thin layer.

For instance, Japanese Patent Application Laid-open No. 237940/1988 (JP-A-63-237940) discloses a composite film which comprises a metal oxide thin layer of indium oxide or tin oxide formed by sputtering, and a heat-sealing layer of an ethylene-propylene copolymer or the like formed thereon. Japanese Patent Application Laid-open No. 202435/1989 (JP-A-1-202435) and Japanese Patent Application Laid-open No. 202436/1989 (JP-A-1-202436) disclose packaging materials for microwave heating or for retort-processing in which the surface of a base film is covered with a vapour-deposited layer of silicon oxide, and either of a heat-sealing layer or a protective layer, the heat-sealing layer being formed by lamination of a polypropylene film or other heat-sealing resin films, while the protective layer being formed by lamination of a film or coating of a thermosetting resin.

However, where a polymer layer is formed by extrusion-lamination process, the barrier property of a film is terribly deteriorated because the heat and the external mechanical force generated during the process cause a crack or defect on the inorganic thin layer. A dry-lamination process for film-lamination is also affected by external mechanical force during the lamination of films or the coating of an adhesive agent, and thus is likely to damage the inorganic thin layer formed on the base film. In the case of a coating process utilised in the formation of a protective layer on an inorganic thin layer, external mechanical force instantly destroys an inorganic thin layer only to give critically decreased barrier properties, not to mention that the coating hinders the development of barrier properties. All of the above-mentioned films, including a film as produced by laminating or coating a vinylidene chloride-series resin or the like onto an inorganic oxide thin layer provided on a base film, have limited adhesive properties of the inorganic oxide thin layer to the base film. Besides, when these films are utilised as a packaging material to be subjected to external mechanical strength or as a packaging material to be exposed to a high temperature/high humidity environment, it is impossible to expect high adhesive properties and high barrier properties which can last for a long period. In particular, the adhesive properties and the barrier properties of these films decline crucially when exposed to severe conditions such as a boiling process or retort treatment process (retorting process).

Japanese Patent Application Laid-open No. 86539/1991 (JP-A-3-86539) discloses a retortable packaging film which is produced by coating the surface of a base film with a reactive two-component curable resin composition composed of a polyisocyanate compound and a saturated polyester polyol and forming a silicon oxide thin layer on the coated surface. Disclosed in Japanese Patent Application Laid-open No. 278946/1991 (JP-A-3-278946) is a packaging material for retort treatment applications which comprises an anchor coat layer, a metal oxide thin layer and a heat-sealing layer provided in this order on the surface of a base layer. Japanese Patent Application Laid-open No. 173137/1992 (JP-A-4-173137) discloses a laminate for a balloon having a good barrier property against helium and hydrogen gas, which is produced by forming an undercoat layer of a two-component curable polyurethane or the like on a film, providing an inorganic oxide thin layer on the undercoat layer, and coating the inorganic oxide thin layer with a vinyl chloride-vinyl acetate copolymer, a polyamide, a polyester or an acrylic resin, or with a hot-melt coating composition.

Japanese Patent Application Publication No. 18395/1996 (JP-B-8-18395) discloses a vapour-deposited film which comprises a base film, a mixture layer of a two-component curable polyurethane and 5 to 30% by weight of a vinyl chloride-vinyl acetate copolymer formed on the base film, and a vapour-deposited layer of a metal oxide such as magnesium oxide deposited on the mixture layer. This literature teaches the use of a reactive two-component curable polyurethane composed of a polyol component and a polyisocyanate compound for prevention of permeation of water, and the use of a vinyl chloride-vinyl acetate copolymer for enhanced adhesive properties of the vapour-deposited layer.

Japanese Patent Application Laid-open No. 131590/1993 (JP-A-5-131590) discloses a laminated film produced by depositing a silicon oxide thin layer on at least one side of a base film, thereon coating a thin layer of a silane coupling agent having an amino group in the terminal, and laminating a resin layer having an acid anhydride group on top of the layers. Japanese Patent Application Laid-open No. 239537/1991 (JP-A-3-239537) discloses a laminated film which comprises a base film, a first transparent layer of silicon oxide, a second transparent layer of a silane coupling agent, and another transparent layer of a pressure-sensitive or heat-sensitive adhesive layer laminated in this order on the base film.

These composite films can improve adhesive strength between the base film and the inorganic oxide thin layer. However, a composite film which shows high adhesive properties and barrier properties in an ordinary state (i.e. a film before subjected to retort treatment) still fails to retain good barrier properties as well as the adhesive properties between the base film and the inorganic oxide thin layer, when used as a film for retort treatment. It is impossible for these films to keep, after retort treatment as well as in an ordinary state (before retort treatment), the adhesive properties between the base film and the inorganic oxide thin layer and the barrier properties at high standards or levels. Moreover, the tackiness of the coated layer of a reactive two-component curable resin composition tends to cause blocking, making winding and rewinding of the film difficult. Thus, the productivity has to be sacrificed. Since the polyol component and the polyisocyanate compound are reactive to each other, the prepared or used two-component curable polyurethane cannot be used repeatedly and has to be discarded only to end in wasteful use of the undercoat resin composition.

To be more demanding, a packaging film for food, medical and pharmaceutical products, and precision electronic parts requires high transparency for the purpose of visual recognition of the contents and for good external appearances. In the aforesaid composite films, however, the decline of adhesive properties of the inorganic thin layer is likely to be accompanied with the decline of transparency.

SUMMARY OF THE INVENTION

It is therefore an object of the present invention to provide a barrier composite film which shows a prominent improvement of not only the adhesive properties between the base film and the inorganic thin layer but also the barrier properties, and a method for producing the film.

It is another object of the present invention to provide a barrier composite film and a production method thereof, which film keeps high adhesive properties between the base film and the inorganic thin layer while prohibiting deterioration of the barrier properties, even when external mechanical force such as bending and crumpling acts on the film or when the film is exposed to severe conditions, namely, a high temperature and high humidity environment due to retort treatment, microwave heating or the like.

It is a further object of the present invention to provide a barrier composite film which can preserve its content for a long time while preventing deterioration or loss of its qualities, owing to its high adhesive properties and high barrier properties, and a method for producing the film, no matter how thin the coating layer may be.

A yet another object of the present invention is to provide a barrier composite film in which the amount of a remaining solvent is remarkably small after printing or lamination, and a method for producing the same.

It is a still further object of the present invention to provide a composite film and a production method thereof which can make efficient use of an anchor coat composition and can ensure good productivity.

Yet another object of the present invention is to provide a barrier composite film which has high transparency and clear visual accessibility to its content and is useful for a packaging film for food, medical and pharmaceutical products, precision electronic parts, etc., and a method for producing the film.

The inventors of the present invention have worked intensively to achieve the above objects, and found that a film comprising a base film, an anchor coat layer provided on the surface of the base film, an inorganic layer formed on the anchor coat layer, and a coating layer formed on the inorganic layer by applying a coating composition containing a silane coupling agent or a barrier resin can improve not only the adhesive properties of the inorganic layer to the base film layer but also the gas barrier properties, the gas barrier properties being unaffected by external mechanical strength or a high temperature/high humidity environment. The present invention is based on the above findings.

The barrier composite film of this invention is constituted with a base layer, an anchor coat layer, an inorganic layer, a barrier resin layer containing a silane coupling agent, wherein at least one side of the base film layer is coated with the other layers in the order of reference. The base film layer can be formed with various polymers such as an olefinic polymer, a polyester and a polyamide, to name a few. The anchor coat layer can be constituted with, for instance, a resin composition at least containing a chlorine-containing resin, or a resin composition comprising a polyisocyanate compound, a chlorine-containing resin and a saturated polyester resin. The inorganic layer comprises, for instance, a variety of a simple substance of a metal including Group 2A elements, transition elements, Group 2B elements, Group 3B elements, Group 4B elements and Group 6B elements of the Periodic Table of Elements, or their inorganic compounds. The barrier resin layer is provided by applying a coating composition containing a silane coupling agent (e.g. a silicon compound having at least one functional group selected from the group consisting of a halogen atom, an epoxy group, an amino group, a hydroxyl group, a mercapto group, a vinyl group, a carboxyl group, and a (meth)acryloyl group, as well as an alkoxy group) and a barrier resin (e.g. a vinylidene chloride-series copolymer, an ethylene-vinyl alcohol copolymer).

The other side of the base film layer (the surface not covered by the above layers) or the barrier resin layer may be covered with a polymer layer such as a heat-sealing layer.

The barrier composite film of the present invention is a film comprising an anchor coat layer, an inorganic oxide thin layer and a barrier resin layer formed on at least one side of a base film layer in the order of reference. The barrier composite film also includes (1) a barrier composite film in which the anchor coat layer has an elastic modulus of $0.1 \times 10^1$ to $1 \times 10^3$ N/mm$^2$, and (2) a barrier composite film in which the anchor coat layer has a peeling strength from the base film layer of not lower than 100 g/15 mm after 30 minutes of retort treatment at 120° C. The barrier resin layer may contain a silane coupling agent.

In this specification, the term "barrier resin layer" indicates a barrier resin-containing layer which shows an oxygen gas permeability of not higher than 20 cc/m$^2$·24 hr. at 25° C., and a water vapour permeability of not higher than 20 g/m$^2$·24 hr. at 40° C. and 90% R.H., as measured for a layer having a thickness of 2 μm. The term "heat-sealing layer" includes a thermally sealable layer not only by means of a heat sealer but also by means of other bonding techniques such as impulse sealing, high frequency bonding and ultrasonic bonding.

DETAILED DESCRIPTION OF THE INVENTION

[Base Film Layer]

As the polymers for constituting the base film layer, there may be exemplified a variety of film-formable polymers, e.g. polyolefins such as polyethylene, an ethylene-ethyl acrylate copolymer, ionomers, polypropylene, an ethylene-propylene copolymer, poly-4-methylpentene-1, etc.; polyesters such as a polyalkylene terephthalate (e.g. polyethylene terephthalate, polybutylene terephthalate), a polyalkylene naphthalate (e.g. polyethylene 2,6-naphthalate), etc.; polyamides such a nylon 6, nylon 11, nylon 12, nylon 66, nylon 610, nylon 6/66, nylon 66/610, nylon MXD, etc.; polyvinyl chloride; vinylidene chloride-series resins such as polyvinylidene chloride, a vinylidene chloride-vinyl chloride copolymer, a vinylidene chloride-acrylonitrile copolymer, a vinylidene chloride-(meth)acrylate copolymer, etc.; styrenic resins such as polystyrene, a styrene-acrylonitrile copolymer, a styrene-acrylonitrile-butadiene copolymer, etc.; polyvinyl alcohol; polyamideimides; polyimides; polyetherimides; polycarbonates; polysulfones; polyethersulfones; poly(ether ether ketones); polyarylates; polyphenylene sulfide; polyphenylene oxide; polyparaxylene; polyacrylonitrile; fluororesins such as polytetrafluoroethylene, polytrifluorochloroethylene, an ethylene fluoride-propylene copolymer, etc.; cellulosic polymers such as cellophane; rubber hydrochloride; and copolymers containing the constituents of the above-mentioned polymers. These polymers can be used singly or in combination.

The base film layer may contain a variety of additives, for example, stabilisers such as antioxidants, ultraviolet absorbers, heat stabilizers, etc.; antistatic agents such as cationic, anionic, nonionic or amphoteric antistatic agents; nucleating agents; hydrocarbon polymers such as styrenic resins, terpene resins, petroleum resins, dicyclopentadiene resins, chmarone resins such as a chmarone-indene resin, phenolic resins, rosins and their derivatives, and the corresponding hydrogenated resins; plasticisers; fillers; various waxes such as higher fatty acid amides, higher fatty acids or their salts, higher fatty acid esters, natural waxes of mineral or vegetable origin, and synthetic waxes such as polyethylene; particulate lubricants inclusive of finely divided mineral lubricants such as silica-series powders and alumina-series powders, and finely divided organic lubricants such as polyethylene-series powders and acrylic powders; and coloring agents.

The light transmittance of the base film layer can be selected as desired. From the standpoint of a sufficient visual access to the contents and an acceptable appearance of the packaged product, the total light transmittance under white light is generally not lower than 40%, preferably not lower than 60%, and more preferably not lower than 80%.

The base film layer is preferably made up of olefinic polymers (particularly, polypropylene-series polymers), polyesters (particularly, polyalkylene terephthalates such as polyethylene terephthalate), polyamides, styrenic polymers, ethylene-vinyl alcohol copolymers, polycarbonates, polyacrylonitriles or the like. Among these, the olefinic polymers, polyesters and polyamides are particularly desirable in terms of transparency, mechanical strength and packaging quality.

As a food packaging material suitable for retort treatment or microwave heating, preferred materials include polymers having high transparency, mechanical strength and packaging quality and having excellent heat resistance, such as polypropylenes, polyesters, polyamides, ethylene-vinyl alcohol copolymers, polycarbonates and polyacrylonitriles. Particularly preferred polymers for the base film layer include polypropylenes, polyesters and polyamides.

The base film layer may be a single-layered film or a laminate film comprising one or more polymer layers. The thickness of the base film is not critical and can be selected appropriately in consideration of the desired packaging quality, mechanical strength, flexibility and so on. The thickness of the base film layer may be generally about 3 to 200 $\mu$m, preferably about 5 to 100 $\mu$m, and more preferably about 10 to 50 $\mu$m (e.g. about 10 to 30 $\mu$m).

The base film layer can be formed by the conventional film forming technology which includes, for example, melt-forming methods such as the inflation method and the T-die method, and the casting method using a solution. The base film layer may be an unoriented film, or a monoaxially or biaxially oriented film. The method for orientation includes known drawing or stretching methods such as roll drawing or stretching, calender drawing or stretching, belt drawing or stretching, tentering, tube drawing or stretching, or a combination of such techniques. The drawing or stretching ratio can be judiciously selected according to the required film characteristics. For example, the ratio may be about 1.5 to 20, preferably about 2 to 15, in at least one direction.

At least one side of the base film layer may be surface-treated in advance. The surface treatment includes corona discharge treatment, plasma treatment, glow discharge treatment, reverse sputter treatment, flame treatment, chromic acid treatment, solvent treatment, surface roughening and so on. Improved adhesive properties can be obtained by forming an anchor coat layer on the surface-treated side of the base film layer.

[Anchor Coat Layer (Undercoat Layer)]

The first feature of the present invention is to interpose an anchor coat layer (or an undercoat layer) between a base film layer and an inorganic layer (in particular, a transparent inorganic layer) formed on at least one side of the base film, thereby drastically improving barrier properties of the composite film as well as adhesive properties between the base film layer and the inorganic layer. So far as not losing the adhesive properties, retort resistance (resistance to retort treatment) or other properties, the anchor coat layer can be made up of various resins such as a thermoplastic resin, a thermosetting resin, an active ray-curable or photo-curable resin (e.g. an electron beam-curable resin, an ultraviolet ray-curable resin) and the like. Typical components of the undercoat layer are thermoplastic resins such as an acrylic resin, a vinyl chloride-vinyl acetate copolymer, a polyvinyl butyral, a polycarbonate, nitro cellulose, cellulose acetate and other cellulosic polymers, and a rosin-modified maleic acid resin; thermosetting resins such as a urethane-series resin, a urea-series resin, a melamine-series resin, a urea-melamine-series resin and an epoxy-series resin; and photo-curable resins such as epoxy (meth)acrylate and urethane (meth)acrylate. These resins can be used alone or as a mixture of two or more.

Preferred anchor coat layers may practically be soft anchor coat layers, including (i) an anchor coat layer containing at least (A) a chlorine-containing resin, and (ii) an anchor coat layer containing (B) a polyisocyanate compound, and (A) a chlorine-containing resin and/or (C) a saturated polyester resin. A particularly preferable anchor coat layer can be made up of, for example, the chlorine-containing resin (A), the polyisocyanate compound (B), the saturated polyester resin (C), and others. It is desirable for the saturated polyester resin (C) to be soft and substantially unreactive to the polyisocyanate compound. If a polyester polyol which is reactive to the polyisocyanate compound (B) is employed as the saturated polyester resin (C), adhesive properties and gas barrier properties of the resultant film declines to a great degree after retort treatment. This is probably because of a cross-linking reaction. Therefore, it is advantageous in the present invention to use a soft and substantially unreactive saturated polyester resin. When the polyisocyanate compound (B) and the soft and unreactive saturated polyester resin are used in combination, blocking properties of the anchor coat layer can be improved owing to the chlorine-containing resin (A). It should be understood that the term "substantially unreactive" is interpreted as not generating a crosslinked or hardened product. Explanations of the chlorine-containing resin (A), the polyisocyanate compound (B) and the saturated polyester resin (C) are to follow.

[(A) Chlorine-containing Resin]

The chlorine-containing resin includes a homo- or co-polymer (a copolymer formed with a chlorine-containing monomer and a copolymerizable monomer) of a chlorine-containing monomer, a graft copolymer as produced by graft copolymerizing a chlorine-containing monomer, a chlorinated polyethylene, a chlorinated polypropylene and other chlorinated polyolefins, typically speaking.

The chlorine-containing monomers, which includes vinyl chloride and vinylidene chloride, to name a few, can be used alone or in combination. A preferred chlorine-containing monomer is vinyl chloride. The copolymerizable monomer includes, for instance, olefins (e.g. ethylene, propylene), vinyl esters (e.g. vinyl acetate, vinyl propionate), vinyl cyanides (e.g. acrylonitrile), (meth)acrylates (e.g. a $C_{1-12}$ alkyl acrylate) and others. These copolymerizable monomers may be employed independently or in combination. Further, polymerizable carboxylic acids or derivatives thereof (e.g. acrylic acid, methacrylic acid, itaconic acid, maleic anhydride, maleic acid, a monoalkyl maleate, a dialkyl maleate, fumaric acid or its derivatives corresponding to the maleic acid derivatives) may be employed as the copolymerizable monomer if added only in a small amount.

The graft copolymer includes, for instance, a graft copolymer as produced by graft polymerizing vinyl chloride (VC) to an ethylene-vinyl acetate copolymer (EVA), a graft copolymer as produced by graft polymerizing vinyl chloride to a polyurethane and so forth.

Desired chlorine-containing resins include a poly(vinyl chloride), a vinyl chloride-based copolymer [e.g. a vinyl chloride-based copolymer (in particular, a vinyl chloride-vinyl acetate-series copolymer) at least comprising vinyl chloride and a copolymerizable monomer (in particular, vinyl acetate, etc.) as monomer components]. A preferable chlorine-containing resin also includes a copolymer comprising three or more components. Such a multi-component polymer comprises a polymerizable carboxylic acid, its derivative (e.g. maleic anhydride) or the like as the third component, in addition to the above two components, vinyl chloride and the copolymerizable monomer.

The proportion of the vinyl chloride relative to the copolymerizable monomer (e.g. vinyl acetate) may practically be selected according to the species of the copolymerizable monomer. For example, the ratio of vinyl chloride/copolymerizable monomer ranges about 95/5 to 50/50 (by weight), preferably about 95/5 to 65/35 (by weight).

The chlorine-containing resin (A) is substantially unreactive to the polyisocyanate compound. In other words, the chlorine-containing resin (A) is unreactive to the polyisocyanate compound (B), or, otherwise, has an active hydrogen atom only in a low concentration even when the resin (A) has an active hydrogen atom. The acid value of the chlorine-containing resin is, for example, about 0 to 30 mg KOH/g and preferably about 0 to 20 mg KOH/g. This acid value is derived from the polymerizable carboxylic acid or its derivative.

The glass transition temperature of the chlorine-containing resin is about 25 to 80° C. (e.g. about 25 to 60° C.), preferably about 30 to 60° C. and practically about 30 to 50° C., typically speaking.

The molecular weight and the polymerization degree of the chlorine-containing resin may be selected from a range not adversely affecting the adhesion properties. For example, the number average molecular weight is about $0.5 \times 10^4$ to $10 \times 10^4$, preferably about $1 \times 10^4$ to $5 \times 10^4$, and more preferably about $1 \times 10^4$ to $3 \times 10^4$. The average polymerization degree is about 100 to 1,000, preferably about 150 to 800, and more preferably about 200 to 700 (e.g. about 300 to 700).

[(B) Polyisocyanate Compound]

As the polyisocyanate compound, use can be made of a compound having at least two isocyanate groups per molecule. Examples of the polyisocyanate compound are aromatic diisocyanates including 2,4-tolylene diisocyanate, 2,6-tolylene diisocyanate, phenylene diisocyanate, xylylene diisocyanate, tetramethylxylene diisocyanate, diphenylmethane diisocyanate, tolidine diisocyanate [bis(4-isocyanate-3-methylphenyl)methane], triphenylmethane triisocyanate and 1,5-naphthalene diisocyanate; aliphatic diisocyanates including 1,4-tetramethylene diisocyanate, 1,6-hexamethylene diisocyanate, trimethylhexamethylene diisocyanate, 1,10-decamethylene diisocyanate, lysine diisocyanate and 1,3,6-hexamethylene triisocyanate; alicyclic diisocyanates including isophorone diisocyanate, a hydrogenated xylylene diisocyanate and a hydrogenated diphenylmethane diisocyanate; modified polyisocyanates; and so on. The modified polyisocyanate includes, for instance, an adduct as formed by adding a polyisocyanate to a polyhydric alcohol, a dimer, a trimer having an isocyanulate ring, an allophanate-modified polyisocyanate, a urea-modified polyisocyanate, a buret-modified polyisocyanate and the like. The polyhydric alcohol in the adduct includes a low molecular weight polyol having three or more hydroxyl groups, such as glycerin, trimethylolpropane, trimethylolethane and other triols, pentaerythritol and other tetraols, generally speaking. These polyisocyanates may be used singly or in combination.

A preferred polyisocyanate compound includes a low molecular weight compound having three or more isocyanate groups per molecule, such as an adduct as formed by adding 3 moles of a polyisocyanate compound (e.g. a diisoyanate) to 1 mole of trimethylolpropane. The molecular weight of the polyisocyanate compound may be selected within the range of, for instance, about 150 to 1,000, and preferably about 300 to 1,000.

[(C) Saturated Polyester Resin]

As the saturated polyester resin, use can be made of a variety of polyesters obtainable by condensing a polycarboxylic acid or its acid anhydride or the lower alcohol ester thereof with a polyhydric alcohol. A hydroxycarboxylic acid may also be used in the condensation reaction.

The polycarboxylic acid component includes, for example, phthalic acid, isophthalic acid, terephthalic acid, trimellitic acid, pyromellitic acid and other aromatic carboxylic acids and the corresponding acid anhydrides; succinic acid, glutaric acid, adipic acid, azelaic acid, sebacic acid and other aliphatic carboxylic acids and the corresponding acid anhydrides. The polycarboxylic acid component may practically be phthalic acid, isophthalic acid, terephthalic acid and other aromatic dicarboxylic acids and the corresponding acid anhydrides; or adipic acid, azelaic acid, sebacic acid and other saturated aliphatic dicarboxylic acid. The hydroxycarboxylic acid includes β-hydroxypropionic acid and β-hydroxybutyric acid.

As the polyhydric alcohol components, there may be exemplified ethylene glycol, propylene glycol, trimethylene glycol, 1,3-butanediol, 1,4-butanediol, 1,5-pentanediol, 1,6-hexanediol, neopentyl glycol and other aliphatic dihydric alcohols; diethylene glycol, triethylene glycol, tetraethylene glycol, dipropylene glycol, tripropylene glycol, tetrapropylene glycol, polytetramethylene ether glycol and other polyoxyalkylene glycols; glycerin, trimethylolpropane, trimethylolethane, pentaerythritol and other aliphatic polyhydric alcohols; cyclohexanediol, a hydrogenated bisphenol A and other alicyclic polyhydric alcohols; bisphenol A-alkylene oxide adducts, such as 2,2-bis(4-dihydroxyethylphenyl)propane and 2,2-bis(4-dihydroxypropylphenyl)propane, and other aromatic polyhydric alcohols.

For the purpose of sealing or capping remained hydroxyl groups or carboxyl groups, a monohydric alcohol or a monocarboxylic acid may be employed as a terminal sealing agent.

A desirable polyester is usually a polyester except a homopoly(alkylene terephthalate). It may practically be (C1) a noncrystalline (amorphous) polyester or a copolyester which is soluble in an organic solvent (e.g. a noncrystalline linear polyester or a copolyester). Such polyester resins include, for instance, a polyester containing an aromatic ring derived from an aromatic polycarboxylic acid such as terephthalic acid, phthalic acid and isophthalic acid (e.g. an oil-free aromatic polyester), and (C2) a thermoplastic elastomer comprising a poly(alkylene ether glycol) unit [e.g. poly(tetramethylene ether glycol) unit] as a soft segment, and a poly(alkylene terephthalate) unit [e.g. poly(ethylene terephthalate) unit, poly(butylene terephthalate) unit] as a hard segment. The saturated polyester resin (C1) includes modified polyesters or copolyesters [modified poly(alkylene terephthalate)] prepared by partial replacement of the alkylene glycol and/or terephthalic acid unit of a poly(alkylene terephthalate) with a different diol (e.g. diethylene glycol, triethylene glycol and other soft diol components) and/or a dicarboxylic acid (e.g. phthalic acid, isophthalic acid, adipic acid); and isophthalic acid-based polyesters comprising isophthalic acid and a glycol (e.g. ethylene glycol) as main components.

The saturated polyester is clearly distinguished from polyols (e.g. polyester polyols, polyether polyols, acrylic polyols) used as a component of a two-component curable adhesive in combination with a polyisocyanate compound. On the one hand, the polyol constituting the two-component curable adhesive usually has an OH value of not less than 40 mg KOH/g for a cross-linking reaction with the polyisocyanate compound. On the other hand, the saturated polyester resin is, similarly to the chlorine-containing resin, substantially unreactive to the polyisocyanate compound. The OH value of the saturated polyester resin is about 0 to 15 mg KOH/g, preferably about 0 to 10 mg KOH/g, and practically about 0 to 5 mg KOH/g. The acid value of the saturated polyester resin may be, for example, about 0 to 10 mg KOH/g, preferably about 0 to 7 mg KOH/g and practically about 0 to 5 mg KOH/g.

In the present invention, it is advantageous to use a soft and unreactive saturated polyester resin in order to retain both the adhesive properties between the base film layer and the inorganic layer and the barrier properties at high levels, whether or not the film is exposed to severe conditions such as retort treatment. The glass transition temperature of the saturated polyester resin is about −10° C. to 20° C., preferably about −5° C. to 15° C. (e.g. about 0 to 15° C.). The glass transition temperature may practically be about 0 to 20° C.

The molecular weight of the saturated polyester resin can be selected from a range not sacrificing the adhesive properties and barrier properties. For example, the number average molecular weight is about $0.5 \times 10^4$ to $10 \times 10^4$, preferably about $1 \times 10^4$ to $5 \times 10^4$ and more preferably about $1 \times 10^4$ to $3 \times 10^4$.

[Proportion of the Components (A), (B) and (C)]

In the anchor coat layer comprising the above components (A), (B) and (C), the proportion of each component can be selected from a range not sacrificing the adhesive properties and barrier properties. For instance, the proportion is, relative to 100 parts by weight of the chlorine-containing resin (A), about 10 to 500 parts by weight of the polyisocyanate compound (B) (preferably about 25 to 400 parts by weight, and more preferably about 30 to 300 parts by weight), and about 1 to 50 parts by weight of the saturated polyester resin (C) (preferably about 2 to 50 parts by weight, and more preferably about 5 to 30 parts by weight). High adhesive properties and barrier properties can still be ensured with an anchor coat comprising about 30 to 200 parts by weight (e.g. 30 to 150 parts by weight) of the polyisocyanate compound (B) and about 3 to 20 parts by weight (e.g. 5 to 20 parts by weight) of the saturated polyester resin (C) relative to 100 parts by weight of the chlorine-containing resin (A).

The amount of the saturated polyester resin (C) is usually less than that of the polyisocyanate compound (B), and, for instance, is about 5 to 50 parts by weight, preferably about 7 to 40 parts by weight and more preferably about 10 to 30 parts by weight, relative to 100 parts by weight of the polyisocyanate compound (B).

In an anchor coat layer comprising the component (B), and either of the component (A) or the component (C), the proportion of the chlorine-containing resin (A) is about 50 to 250 parts by weight (preferably about 75 to 200 parts by weight), and that of the saturated polyester resin (C) is about 5 to 50 parts by weight (preferably about 10 to 25 parts by weight), each relative to 100 parts by weight of the polyisocyanate compound (B).

The anchor coat layer may contain a variety of additives such as stabilisers including an antioxidant, an ultraviolet absorber and a heat stabiliser, plasticisers, fillers, colouring agents and so on.

The thickness of the anchor coat layer (the undercoat layer) can be selected from a range where the adhesive properties to the inorganic layer can be improved without sacrificing the barrier properties, to be specific, from a range of about 0.01 to 5 $\mu$m (e.g. 0.1 to 5 $\mu$m) and preferably about 0.1 to 1 $\mu$m (e.g. 0.2 to 1 $\mu$m). An anchor coat layer with an thickness of about 0.2 to 0.7 $\mu$m shows good adhesive properties to the inorganic layer with retaining the barrier properties.

[Inorganic layer]

Another feature of the present invention is to coat the surface of a base film with the anchor coat layer, the inorganic layer (particularly, a transparent inorganic layer), and the barrier resin layer containing a silane coupling agent. This layer combination drastically improves not only the adhesive properties between the base film and the inorganic layer but also the barrier properties. The resultant film, further provided with an enhanced boiling-resistance and retort-resistance, prevents the decline of the adhesive properties and barrier properties even when affected by external mechanical force or exposed to severe conditions with a high temperature and a high humidity during retort treatment or microwave heating. Moreover, the film exhibits a remarkable transparency, which is assumed to be due to the high compatibility between the inorganic layer and the barrier resin layer. Even with a thin coating layer, the resulting film ensures excellent barrier properties. In addition, the combination of the anchor coat layer, the inorganic layer and the coating layer decreases the loss of microwaves during microwave heating by a microwave oven or the like.

The inorganic substance forming the inorganic layer is preferably an inorganic substance capable of forming a thin and transparent layer. Such an inorganic substance includes, for example, Group 2A elements of Periodic table such as beryllium, magnesium, calcium, strontium, barium, etc.; transition elements such as titanium, zirconium, ruthenium, hafnium, tantalum, etc.; Group 2B elements such as zinc etc.; Group 3B elements such as aluminum, gallium, indium, thallium, etc.; Group 4B elements such as silicon, germanium, tin, etc.; and Group 6B elements such as selenium, tellurium, etc.; and inorganic compounds containing these elements, such as the oxides, halides, carbides and nitrides. These inorganic substances can be employed singly or in combination.

The preferred inorganic substance includes, among others, Group 2A elements such as magnesium, calcium, barium, etc.; transition elements such as titanium, zirconium, tantalum, ruthenium, etc.; Group 2B elements such as zinc; Group 3B elements such as aluminum, indium, thallium, etc.; Group 4B elements such as silicon, tin, etc.; Group 6B elements such as selenium; and the oxides of these elements. The inorganic layer is most preferably formed of one of Group 3B or Group 4B elements or its oxide.

Among the inorganic substances mentioned above, the oxides of the elements (e.g. tin oxide, aluminium oxide, indium oxide, the corresponding composite oxide, silicon oxide, etc.) are very satisfactory in transparency and barrier properties. Particularly, silicon oxide has more advantages in addition to the above characteristics. It can form a dense layer and has a good affinity for the polymer constituting the silane coupling agent-containing barrier resin layer. Further, a layer of silicon oxide does not develop any crack or defect even when external mechanical force is imposed, and it shows sustained high barrier properties for a long time even at high temperatures. It should be understood that the above silicon oxide includes not only silicon monoxide and silicon dioxide but also silicon-containing oxides which are represented by the compositional formula SiOx (wherein $0 < x \leq 2$, preferably $0.8 \leq x \leq 1.5$).

As a packaging material for microwave heating, use can be made of inorganic compounds having low electric conductivity, such as the oxides, halides, carbides, nitrides, and other electrically nonconductive substances. The preferred electrically nonconductive inorganic substance includes oxides such as silicon oxide.

The thickness of the inorganic layer can be selected within the range of generally about 100 to 5,000 Å (0.01 to 0.5 μm), preferably about 200 to 3,000 Å (0.02 to 0.3 μm) and more preferably about 300 to 1,500 Å (0.03 to 0.15 μm). If the thickness is less than 100 Å, it is difficult to form a homogeneous thin layer, giving only insufficient barrier effects and mechanical strength. An inorganic layer with a thickness of over 5,000 Å does not contribute to appreciable improvement in barrier performance, but leads to loss of transparency or deterioration of the external appearance, being economically disadvantaged as well.

[Barrier Resin Layer]

As the barrier resins constituting the coating layer, there may be mentioned a resin having the above-mentioned high gas barrier properties, including vinylidene chloride-based copolymers, ethylene-vinyl alcohol copolymers, polyamide-series polymers, polyvinyl alcohol-series polymers, polyacrylonitrile-series polymers, urethane polymers and so on. Incidentally, some of the resins do not show the above-specified barrier properties depending on the composition of the barrier resin in the coating layer. An example of such resins is a thermoplastic polyurethane having a comparatively long segment (e.g. a polyalkylenoxy segment). The barrier resins mentioned above can be used singly or in combination.

The preferred barrier resin includes vinylidene chloride-based copolymers and ethylene-vinyl alcohol copolymers. The vinylidene chloride-based polymers are copolymers of vinylidene chloride with other copolymerizable monomers. As the copolymerizable monomers, there may be exemplified vinyl chloride, vinyl acetate, crotonic acid, acrylic acid and acrylates (e.g. a $C_{1-8}$ alkyl acrylate) such as methyl acrylate, ethyl acrylate, propyl acrylate, isopropyl acrylate, butyl acrylate, isobutyl acrylate, tert-butyl acrylate, pentyl acrylate, hexyl acrylate, etc., acrylonitrile, methacrylonitrile, and methacrylic acid and methacrylates corresponding to the acrylates mentioned above. Among these vinylidene chloride-based copolymers, the preferred copolymers are a vinylidene chloride-acrylonitrile copolymer, a vinylidene chloride-methacrylic acid copolymer, a vinylidene chloride-acrylate copolymer, a vinylidene chloride-methacrylate copolymer, a vinylidene chloride-vinyl acetate copolymer and so on. The vinylidene chloride contents in the vinylidene chloride-based copolymers are generally about 85 to 99 weight % and preferably about 90 to 97 weight %.

The ethylene-vinyl alcohol copolymer is preferably a solvent-soluble or solvent-dispersible ethylene-vinyl alcohol copolymer. The ethylene content of the ethylene-vinyl alcohol copolymer is generally about 5 to 50 mol %, preferably about 10 to 45 mol %, and more preferably about 25 to 35 mol %, and its molecular weight (weight average molecular weight) may be, for example, about $1 \times 10^4$ to $10 \times 10^4$, preferably about $2 \times 10^4$ to $7 \times 10^4$, and more preferably about $4 \times 10^4$ to $5 \times 10^4$. The degree of saponification is preferably not less than 99.5%. Such a solvent-soluble ethylene-vinyl alcohol copolymer is soluble or dispersible in water or in a mixed solvent of water and an alcohol, and gives a thin film by coating.

Depending on the desired barrier performance (barrier properties with respect to, for example, oxygen, water vapour, carbon dioxide, organic solvent gas and an aroma component such as limonene), the barrier resin layer may comprise at least one species, or more than one species of the above barrier resins (preferably, vinylidene chloride-based copolymers and ethylene-vinyl alcohol copolymers). The barrier resin layer may be formed with a plurality of layers each containing the barrier resin. For example, the barrier resin coating layer may have a multi-layered structure including a vinylidene chloride-based copolymer layer and an ethylene-vinyl alcohol copolymer layer. The barrier resin content of the barrier resin layer is not less than 50 weight %, preferably about 75 to 100 weight %, and more preferably about 90 to 100 weight %.

Furthermore, the barrier resin layer may contain other polymers such as an ethylene-vinyl acetate copolymer, an ethylene-ethyl acrylate copolymer and other olefinic polymers; acrylic polymers; styrenic polymers; polyesters; polyacetals; polyvinyl acetate; polyvinyl chloride; a vinyl chloride-vinyl acetate copolymer; polyamides; urethane-series polymers; acrylonitrile-series polymers; polycarbonates; chlorinated polyolefins; cellulosic polymers and so on.

Where necessary, the barrier resin layer may contain additives such as those mentioned above, an antiblocking agent, and an adhesion improver such as polyethyleneimines, polyisocyanates and so on.

[Silane Coupling Agent]

The silane coupling agent includes various compounds which can improve adhesive properties to the inorganic layer, base film layer or barrier coating layer, such as a silicon compound having at least one functional group selected from the group consisting of a halogen atom, an epoxy group, an amino group, a hydroxyl group, a mercapto group, a carboxyl group, a vinyl group, and a (meth)acryloyl group, as well as an alkoxy group.

The halogen atom includes fluorine, chlorine, bromine and iodine atoms, practically being a chlorine atom or a bromine atom. The epoxy group may be composed of an epoxy ring formed by oxidation of an unsaturated bond of a hydrocarbon group (e.g. an unsaturated double bond of a cyclopentenyl group, a cyclohexenyl group, a cyclooctenyl group or other cycloalkenyl groups), or an epoxy ring of a glycidyl group. The amino group may be substituted with 1 or 2 lower alkyl groups (e.g. a $C_{1-4}$ alkyl group such as methyl, ethyl, propyl, isopropyl and butyl groups). The (meth)acryloyl group may be formed by a (meth)acryloyloxy group.

As the alkoxy groups, there may be mentioned, for instance, methoxy, ethoxy, propoxy, isopropoxy, butoxy, isobutoxy, s-butoxy, t-butoxy and other $C_{1-4}$ alkoxy groups. A preferable alkoxy group includes a hydrolysable alkoxy group (in particular, a methoxy group or an ethoxy group). The silicon compound has about 1 to 3 (specifically 1 or 2) reactive functional groups and about 1 to 3 (practically 2 or 3) alkoxy groups.

A desirable example of the silane coupling agent includes a silicon compound shown by the following formula, $$Y-(R)_n-SiX_3$$

wherein Y represents one functional group selected from the group consisting of a halogen atom, an epoxy group, an amino group, a mercapto group, a carboxyl group, a vinyl group and a (meth)acryloyl group; R represents a hydrocarbon residue; X indicates the same or different alkoxy group; and n denotes 0 or 1.

The functional group represented by Y and the alkoxy group indicated by X are similar to those exemplified above.

As the hydrocarbon residues represented by R, there may be mentioned, for example, an alkylene group (e.g. methylene, ethylene, trimethylene, propylene, 2,2-dimethylmethylene, tetramethylene, pentamethylene, hexamethylene and other straight-chain or branched-chain $C_{1-6}$ alkylene groups), a cycloalkene residue (e.g. cycloheptene, cyclohexene, cyclopentene, cyclooctene and other $C_{4-10}$ cycloalkene residues), a cycloalkene-alkyl residue (e.g. cycloheptene-, cyclohexene-, cyclopentene- and other $C_{4-10}$ cycloalkene-$C_{1-6}$ alkyl groups) and so on. Incidentally, the cycloalkene residue and cycloalkene-alkyl residue may practically be a residue formed by epoxidation of a double bond as mentioned above. The preferred hydrocarbon residue R includes a $C_{1-4}$ alkylene residue (particularly, a $C_{2-4}$ alkylene residue) and a $C_{5-8}$ cycloalkene-$C_{1-4}$ alkyl residue (specifically, a cyclohexene-$C_{2-4}$ alkyl residue).

Further in the formula, n denotes 0 or 1. When Y is a vinyl group, n may practically be 0, and when Y is another functional group, n may practically be 1.

Examples of the silane coupling agent include;
(i) halogen-containing silane coupling agents (e.g. 2-chloroethyltrimethoxysilane, 2-chloroethyltriethoxysilane, 3-chloropropyltrimethoxysilane, 3-chloropropyltriethoxysilane),
(ii) epoxy group-containing silane coupling agents [e.g. 2-(3,4-epoxycyclohexyl)ethyltrimethoxysilane, 2-(3,4-epoxycyclohexyl)ethyltriethoxysilane, 3-(3,4-epoxycyclohexyl)propyltrimethoxysilane, 2-glycidyloxyethyltrimethoxysilane, 2-glycidyloxyethyltriethoxysilane, 3-glycidyloxypropyltrimethoxysilane, 3-glycidyloxypropyltriethoxysilane, etc.],
(iii) amino group-containing silane coupling agents (e.g. 2-aminoethyltrimethoxysilane, 3-aminopropyltrimethoxysilane, 3-aminopropyltriethoxysilane, 2-[N-(2-aminoethyl)amino]ethyltrimethoxysilane, 3-[N-(2-aminoethyl)amino]propyltrimethoxysilane, 3-(2-aminoethyl)amino]propyltriethoxysilane, 3-[N-(2-aminoethyl)amino]propyl methyl dimethoxysilane),
(iv) mercapto group-containing silane coupling agents (e.g. 2-mercaptoethyltrimethoxysilane, 3-mercaptopropyltrimethoxysilane, 3-mercaptopropyltriethoxysilane),
(v) carboxyl group-containing silane coupling agents (e.g. carboxymethyltrimethoxysilane, carboxymethyltriethoxysilane, 2-carboxyethyltrimethoxysilane, 2-carboxyethyltriethoxysilane, 3-carboxypropyltrimethoxysilane, 3-carboxypropyltriethoxysilane),
(vi) vinyl group-containing silane coupling agents (e.g. vinyltrimethoxysilane, vinyltriethoxysilane), and
(vii) (meth)acryloyl group-containing silane coupling agents (e.g. 2-methacryloyloxyethyltrimethoxysilane, 2-methacryloyloxyethyltriethoxysilane, 2-acryloyloxyethyltrimethoxysilane, 3-methacryloyloxypropyltrimethoxysilane, 3-methacryloyloxypropyltriethoxysilane, 3-acryloyloxypropyltrimethoxysilane). These silane coupling agents may be used singly or in combination.

The amount of the silane coupling agent can be selected within the range for improving the adhesive properties of the inorganic layer, and is, for instance, about 0.05 to 10 parts by weight (e.g. about 0.1 to 10 parts by weight), preferably about 0.1 to 7 parts by weight (e.g. about 0.2 to 7 parts by weight) and more preferably about 0.5 to 5 parts by weight (e.g. about 0.5 to 3 parts by weight) relative to 100 parts by weight of the barrier resin.

The thickness of the barrier resin layer can be selected within the range not adversely affecting the film characteristics, and may be, for example, about 0.05 to 15 $\mu$m, preferably about 0.1 to 10 $\mu$m (e.g. 0.2 to 7 $\mu$m), and more preferably about 0.25 to 5 $\mu$m (e.g. 0.3 to 3 $\mu$m). If the coating layer is thinner than 0.05 $\mu$m, it is difficult to impart desirable barrier properties. A coating layer thicker than 15 $\mu$m would not be rewarded with a commensurate improvement of barrier performance, but would rather be uneconomical.

The thickness ratio of the barrier resin layer to the inorganic layer can be selected as desired, but it should be noted that this ratio has an influence on barrier properties. In order to provide high gas barrier properties and chemical or physical resistance, the ratio T/t, i.e. the ratio of the thickness T ($\mu$m) of the barrier resin layer relative to the thickness t ($\mu$m) of the inorganic layer, may be, for example, about 0.1 to 1,500, preferably about 0.5 to 500 (e.g. about 0.5 to 60, preferably about 1 to 200), and more preferably about 1 to 100. In many instances, the preferred ratio is about 2 to 50 (e.g. about 5 to 50). If the thickness ratio deviates from the above range, it is difficult to give high gas barrier properties to a film. If the above ratio is less than 0.1, the inorganic layer tends to be damaged by external force. On the other hand, a film with a ratio of over 1,500 would not be rewarded with a commensurate improvement in barrier performance and be uneconomical.

[Characteristics of the Barrier Composite Film]

One of the characteristics of the barrier composite film of this invention is that the film comprises a soft anchor coat layer. Namely, the barrier composite film of this invention further includes a barrier composite film comprising a soft anchor coat layer (an anchor coat layer with an elastic modulus of $0.1 \times 10^1$ to $1 \times 10^3$ N/mm$^2$), an inorganic oxide thin layer, and a barrier resin layer formed on at least one side of a base film layer in the order of reference. A preferable anchor coat layer has an elastic modulus of about $0.5 \times 10^1$ to $7 \times 10^2$ N/mm$^2$, above all, about $1 \times 10^1$ to $5 \times 10^2$ N/mm². In general, the barrier resin layer contains a silane coupling agent.

Another feature of the barrier composite film of this invention is that the film shows high adhesive properties and high gas barrier properties even under severe conditions such as retort treatment. Such composite films include a barrier composite film comprising an anchor coat layer, an inorganic oxide thin layer and a barrier resin layer formed in this order on at least one side of a base film layer, wherein the peeling strength of the barrier resin layer from the base film layer is not lower than 100 g/15 mm (e.g. 100 to 500 g/15 mm) layer after 30 minutes of retort treatment at a temperature of 120° C. The barrier resin layer usually contains a silane coupling agent. A desirable peeling strength of the barrier layer from the base film layer is about 150 to 450 g/15 mm, and, in particular, about 200 to 400 g/15 mm.

These composite films have good gas barrier properties. Shown below are an oxygen gas permeability and a water vapour permeability of a composite film measured after 30-minute retort treatment at 120° C., the composite film comprising a base layer with a thickness of 10 to 30 μm and a coating layer with a thickness of 0.5 to 5 μm (e.g. about 1 to 3 μm) made of the anchor coat layer, the inorganic layer and the barrier resin layer.

Oxygen gas permeability (at 25° C.): about 2 cc/m²·24 hr. or less (e.g. 0.01 to 1.5 cc/m²·24 hr.), preferably about 1.5 cc/m²·24 hr. or less (e.g. 0.01 to 1.5 cc/m²·24 hr.) and more preferably about 1 cc/m²·24 hr. or less (e.g. 0.01 to 1 cc/m²·24 hr.).

Water vapour permeability (at 40° C., 90% R.H.): about 3 g/m²·24 hr. or less (e.g. 0.01 to 2.8 g/m²·24 hr.), preferably about 2.5 g/m²·24 hr. or less (e.g. 0.01 to 2.5 g/m²·24 hr.) and more preferably about 2 g/m²·24 hr. or less (e.g. 0.01 to 2.0 g/m²·24 hr.).

In an ordinary state (before retort treatment), a film of the same composition [base film layer: 10 to 30 μm, covering or coating layer (anchor coat layer/inorganic layer/barrier resin coating layer): 0.5 to 5 μm (e.g. about 1 to 3 μm)] shows an oxygen gas permeability and a water vapour permeability as shown below.

Oxygen gas permeability (at 25° C.): about 1 cc m²·24 hr. or less (e.g. 0.01 to 1 cc/m²·24 hr.), and preferably about 0.01 to 0.5 cc/m²·24 hr. or less.

Water vapour permeability (at 40° C., 90% R.H.): about 3 g/m²·24 hr. or less (e.g. 0.01 to 2 g/m²·24 hr.), and preferably about 0.01 to 1.5 g/m²·24 hr. or less.

[Polymer Layer]

When one side of the base film layer is provided with the anchor coat layer, the inorganic layer and the barrier resin layer (the coating layer), the other side (uncoated/uncovered surface) of the base film layer or the surface of the barrier resin layer may be covered with a polymer layer in order to impart printing properties, adhesive properties or other properties to the composite film for its intended application. The polymer layer may be either transparent or opaque. Desirable polymer layers include a heat-sealing layer for simplified production of a bag.

The polymer forming the heat-sealing layer includes heat-bondable polymers, for example, olefinic polymers, a vinyl acetate-vinyl chloride copolymer, polyesters, polyamides and rubber-series polymers. These heat-bondable polymers can be used singly or in combination.

The heat-bondable olefinic polymer includes, for example, polyethylene inclusive of a low density polyethylene and a linear low density polyethylene, an ethylene-butene-1 copolymer, an ethylene-(4-methylpentene-1) copolymer, an ethylene-hexene-1 copolymer, an ethylene-vinyl acetate copolymer, an ethylene-(meth)acrylic acid copolymer, an ethylene-(meth)acrylate copolymer, ionomers, polypropylenes, a propylene-butene-1 copolymer, an ethylene-propylene copolymer, an ethylene-propylene-butene-1 copolymer, an ethylene-propylene-diene copolymer, and modified polyolefins such as maleic anhydride-modified polyethylene and maleic anhydride-modified polypropylene. The preferred olefinic polymer includes polyethylenes, an ethylene-vinyl acetate copolymer, an ethylene-ethyl acrylate copolymer, amorphous polyolefins (e.g. amorphous polypropylene), an ethylene-propylene copolymer and so on. When the heat-sealing layer is formed by the lamination technique, the preferred heat-bondable film includes an unoriented or unstretched polypropylene film and an unoriented or unstretched ethylene-propylene copolymer film.

The heat-bondable polyester includes aliphatic polyesters comprising both an aliphatic diol and an aliphatic dicarboxylic acid. The heat-bondable polyamide includes, for example, nylon 11, nylon 12 and nylon 6/12. The rubber-series polymer includes, for example, a butyl rubber, an isobutylene rubber, a chloroprene rubber, a styrene-acrylonitrile copolymer, a styrene-butadiene copolymer, a styrene-acrylonitrile-butadiene copolymer (terpolymer) and so on.

The thickness of the heat-sealing layer can be liberally selected, for example from the range of about 3 to 100 μm, according to the intended uses of the packaging material. When the heat-sealing layer is provided by the film laminating method, the thickness may for example be about 20 to 100 μm and preferably about 30 to 80 μm.

The heat-sealing layer needs to be provided only on a predetermined position on the surface of the base film layer or the barrier resin layer, e.g. a heat-sealing position. The heat-sealing layer, which may cover a part or the whole of the base film layer or the barrier resin layer, may practically be formed on the whole surface.

The heat-sealing layer may contain the above-mentioned additives, if necessary.

[Production of the Barrier Composite Film]

The barrier composite film of the present invention is obtainable by covering at least one side of the base film with the anchor coat layer, the inorganic layer, the barrier resin layer containing the silane coupling agent in this order.

Another barrier composite film of the present invention can be produced by forming the polymer layer such as the heat-sealing layer on the other side of the base film or on the surface of the barrier resin layer. By way of illustration, the barrier composite film can be produced according to, (i) a process of covering or coating at least one side of the base film with the anchor coat layer, the inorganic layer, the barrier resin layer containing the silane coupling agent, and the polymer layer such as the heat-sealing layer in the order of reference;

(ii) a process which comprises covering or coating one side of the base film with the anchor coat layer, the inorganic layer and the barrier resin layer containing the silane coupling agent in this order, and coating the other side of the base film with the polymer layer such as the heat-sealing layer; or (iii) a process which comprises covering or coating one side of the base film with the anchor coat layer, the inorganic layer, the barrier resin layer containing the silane coupling agent, and the polymer layer such as the heat-sealing layer in this order, and covering the other side of the base film with the polymer layer such as the heat-sealing layer as well.

The anchor coat layer can be formed in a manner not particularly specified. For instance, a process for the anchor coat layer formation comprises the step of coating an organic or aqueous coating composition containing the anchor coat component (e.g. a coating composition containing the anchor coat components (A), (B) and (C), and a solvent) by a conventional technology such as roll coating, gravure coating, reverse coating, spray coating, and the step of drying or curing the coated layer. Curing can be effected, in the case of the photo-curable resin coating, by irradiation of an active ray. The coating composition may be whichever of a solution or a dispersion. As the solvents, there may be mentioned, for instance, hexane, cyclohexane, benzene, toluene and other hydrocarbons, ethyl acetate, butyl acetate and other esters, acetone, methyl ethyl ketone and other ketones, tetrahydrofuran and other ethers, and mixed solvents of these solvents.

Unlike the two-component curable adhesive composed of a polyisocyanate compound and a polyol, the anchor coat layer comprising the components (A), (B) and (C) is not adhesive and exhibits high antiblocking properties. Consequently, winding and rewinding of the film can be conducted smoothly even when the anchor coat layer is formed by coating, whereby productivity of the composite film is enhanced.

The inorganic layer can be formed by covering the surface of the anchor coat layer with the inorganic substance utilising the conventional technology which includes physical methods (e.g. vacuum vapour deposition, reactive vapour deposition, sputtering, reactive sputtering, ion plating, reactive ion plating, etc.) and chemical methods (e.g. CVD, plasma CVD and laser CVD processes). The inorganic layer can be formed on either side or both sides of the base film layer, practically by physical methods such as vapour deposition. By way of illustration, the thin layer can be formed by vacuum vapour deposition: by supplying a roll of a base film covered with the anchor coat layer, with rolling the film out, into a rolled-up vacuum deposition apparatus under a reduced pressure of about $10^{-3}$ to $10^{-6}$ Torr, and by vapourising the inorganic compound under heating by means of electron beam, high frequency induction heating, resistance heating or other techniques, thereby depositing the inorganic compound continuously.

The barrier resin layer can be provided by applying a coating composition containing the silane coupling agent and the barrier resin on the surface of the inorganic layer. The coating composition is obtainable by a proper selection of solvents, considering the species of the silane coupling agent and the barrier resin. The coating composition may be in the form of a solution or a dispersion.

To give a specific example, the solvent for the coating solution containing a vinylidene chloride-based copolymer can be selected according to the species of the vinylidene chloride-series copolymer, for example, from ketones such as acetone, methyl ethyl ketone and cyclohexanone; ethers such as dioxane, diethyl ether and tetrahydrofuran; aromatic hydrocarbons such as benzene, toluene and xylene; esters such as ethyl acetate and butyl acetate; amides such as dimethylformamide; and mixtures of these solvents. The dispersions are, in general, available on the market in the form of an O/W emulsion.

The coating composition containing the ethylene-vinyl alcohol copolymer can be prepared with using a mixed solvent composed of water and an alcohol. As the alcohols, there may be exemplified methanol, ethanol, propanol, isopropanol, cyclohexanol and the like.

The coating composition may contain the above-mentioned additives. For improved coatability, the coating composition may contain conventional additives such as an antifoamer and a rheology modifier (e.g. viscosity controlling agent).

The coating can be effected in any manner so far as not giving a crack or a defect to the inorganic layer, for instance, by conventional techniques including air-knife coating, roll coating, gravure coating, blade coating, dip coating, spray coating and other coating methods. The barrier resin coating layer can be formed by applying the coating composition and drying the coating, for example, at around 50 to 150° C.

Regardless of the presence of the heat-sealing layer, the surface of the barrier resin coating layer may be subjected to a conventional surface treatment as described in the section of the base film layer, where necessary. The surface may, otherwise, be partially or entirely provided with the polymer layer (e.g. an adhesive layer, a protective layer) without any surface treatment.

The polymer layer can be formed by a conventional technique such as coating or lamination. The heat-sealing layer can be formed by a conventional process such as dry lamination, extrusion lamination or coating according to the kind of heat-bondable polymer.

Additionally, various coating layers or laminating layers may be formed on the barrier composite film of this invention, according to the species and the use of the film. Such layers include a lubricating layer, an antistatic layer, an ornamental printed film layer and a reinforcing layer such as a nylon film.

The barrier composite film of the present invention shows notable improvements not only in adhesive properties of the inorganic layer to the base film layer but also in barrier properties. What is more, the composite film exhibits good barrier properties even under external mechanical force or under the severe environments during retorting process or microwave heating. The barrier composite film, which ensures the above-mentioned high gas barrier properties even when the coating layer is extremely thin, is highly transparent, so that a content in the film can be clearly recognised by sight. The composite films are suitable for packaging materials or for the production of balloons including a balloon and a hot-air balloon. Such packaging materials are applicable to packaging of foods for microwave cooking, retort-processed foods, frozen foods, microwave-sterilisation, barriers for flavours, medical and pharmaceutical products, precision electronic parts and others. When used as a food package, high adhesive properties and barrier properties of the film serve a long-term storage of foods, inhibiting the deterioration or degradation of the quality of its content. As has been described, the present invention also discloses a use of the barrier composite film for packing various kinds of contents including the aforesaid foods, medical/pharmaceutical products, electronic parts and other products.

The shape of a package made from the film of the invention is not particularly restricted. The package can be utilised as a bag (package) for a solid substance or a bag (package) for a liquid substance. The food-containing bag can be directly processed through retort treatment or microwave heating.

The packaging material of the present invention can be put to use in various packaging style including containers such as bags or pouches, cups, tubes, standing bags, trays, etc.; lids or covers; interliners of paper packs for sake, soy, mirin, oil, milk, soft drinks and so on.

The barrier composite film of the invention, which is constituted with a combination of the anchor coat layer, the inorganic layer, the barrier resin layer containing the silane coupling agent, remarkably improves gas barrier properties as well as adhesive strength between the base film layer and the inorganic thin layer. Even when subjected to external mechanical force such as bending and crumpling, or exposed to the environments of a high temperature and humidity during retort treatment or microwave heating, this composite film displays good gas barrier properties for a long period with maintaining high adhesive properties between the base film and the inorganic thin layer. Even a film with a thin coating layer ensures the gas barrier properties, in addition to its high transparency. Thus, the film has enough transparency for visual recognition of its content, and is useful for long-term preservation or storage of food, pharmaceutical products, precision electronic parts and other contents.

The barrier composite film of this invention guarantees safety in applications as a food package, because solvents contained in a printing ink or a lamination adhesive, each being used for printing or lamination on the barrier resin layer, scarcely penetrate into the base film, thus keeping the amounts of remaining solvents very low.

If the resin component of the anchor coat layer is substantially unreactive to the polyisocyanate component, the resulting anchor coat layer is non-adhesive and develops no blocking. Therefore, not only the anchor coat composition can be used again and again, but also the film can be wound and rewound smoothly, thereby enhancing the productivity of the composite film.

The following examples are intended to describe the present invention in further detail and should by no means be interpreted as defining the scope of the invention.

EXAMPLES

Examples 1 and 2

Preparation of the Anchor Coat Composition

An anchor coat composition was prepared with using the below anchor coat components. Relative to 100 parts by weight of a vinyl chloride-series copolymer (A1), 100 parts by weight of a polyisocyanate compound (B1) and 15 parts by weight of a saturated polyester resin (C), in terms of a dry matter, were mixed to give an anchor coat composition.

(A1) Vinyl chloride-series copolymer: Denki Kagaku Kogyo Co., Ltd., Denka 1000C, a vinyl chloride-vinyl acetate-maleic anhydride copolymer; chlorine content 48.8%, average degree of polymerisation 430, glass transition temperature 43° C., acid value derived from maleic anhydride about 10 mg KOH/g (B1) Polyisocyanate compound: Nippon Polyurethane Industries, Ltd. Colonate L, an adduct of tolylenediisocyanate-trimethylolpropane; nonvolatile 75% by weight, isocyanate content 12%

(C) Saturated Polyester Resin: Toyobo Co., Ltd., Vylon 30SS, a polyester resin comprising terephthalic acid and ethylene glycol as main components; number average molecular weight 22,000, glass transition temperature 7° C., hydroxyl value 4.8 mg KOH/g Preparation of a Coating Agent To 100 parts by weight of a vinylidene chloride-series copolymer (Trade name: Saran Resin F 216, manufactured by Asahi Chemical Industry Co., Ltd.) was added 1.0 part by weight of γ-glycidoxypropyltrimethoxysilane (i.e. 3-glycidyloxypropyltrimethoxysilane) (Trade name: TSL 8350, manufactured by Toshiba Silicone Co., Ltd.). The mixture was dissolved in a mixed solvent of toluene/tetrahydrofuran (1/2 by weight) to give a coating composition for a barrier resin layer with a resin concentration of 15% by weight. The vinylidene chloride-series copolymer is a copolymer comprising 85 mol % or more of a vinylidene chloride monomer as a main component, and at least one species selected from acrylic acid, methyl methacrylate or methacrylonitrile as a comonomer.

On one surface of a 12-μm-thick biaxially oriented polyethylene terephthalate film (PET), the above anchor coat composition was applied in such a manner as to form a dried layer in a thickness of 0.3 μm. After the composition had dried, a silicon oxide vapour deposit layer was deposited in a thickness of 500 Å as the inorganic layer by vacuum depositing under a vacuum of $5 \times 10^{-3}$ Torr, using SiO as a vapour source. The coating composition was applied on the inorganic layer using a bar coater so that the dried layer has a thickness of 0.5 μm (Example 1) or 2.5 μm (Example 2). The coated film was dried in an oven for 30 seconds at 105° C. to form a barrier resin layer. A composite film was thus obtained.

Example 3

To 100 parts by weight of a vinylidene chloride-series copolymer (Trade name: Saran Resin F 216, manufactured by Asahi Chemical Industry Co., Ltd.) was added 1.0 part by weight of γ-aminopropyltriethoxysilane (i.e. 3-aminopropyltriethoxysilane) (Trade name: TSL 8331, manufactured by Toshiba Silicone Co., Ltd.). A coating composition for a barrier resin layer with a 15-weight-percent resin concentration was obtained by dissolving the resultant mixture in a mixed solvent of toluene/tetrahydrofuran (1/2 by weight).

Except for forming a dry coating layer in a thickness of 2.5 μm by application of the coating composition onto an inorganic layer, a composite film was produced in the same manner as in Example 1.

Example 4

Added to 100 parts by weight of a vinylidene chloride-series copolymer (Trade name: Saran Resin F 216, manufactured by Asahi Chemical Industry Co., Ltd.) was 1.0 part by weight of vinyltrimethoxysilane (Trade name: TSL 8311, manufactured by Toshiba Silicone Co., Ltd.). The mixture was dissolved in a mixed solvent of toluene/tetrahydrofuran (1/2 by weight) to give a coating composition for a barrier resin layer with a resin concentration of 15% by weight.

A composite film was produced in the same manner as in Example 1, except that the dried layer of the coating composition formed on an inorganic layer had a thickness of 2.5 μm.

Example 5

To 100 parts by weight of a vinylidene chloride-series copolymer (Trade name: Saran Resin F 216, manufactured by Asahi Chemical Industry Co., Ltd.) was added 1.0 part by weight of γ-mercaptopropyltriethoxysilane (Trade name: TSL 8380, manufactured by Toshiba Silicone Co., Ltd.). A coating composition for a barrier resin layer with a 15-weight-percent resin concentration was obtained by dissolving the resultant mixture in a mixed solvent of toluene/tetrahydrofuran (1/2 by weight).

Example 6

To 100 parts by weight of an ethylene-vinyl alcohol copolymer (Trade name: Soanol 30L, manufactured by Nippon Synthetic Chemical Industry Co., Ltd.) was added 1.0 part of γ-glycidoxypropyltrimethoxysilane (Trade name: TSL 8350, manufactured by Toshiba Silicone Co., Ltd.). The mixture was dissolved in a mixed solvent of water/isopropanol (1/1 by weight). Thus obtained was a coating composition for a barrier resin layer with a resin concentration of 12% by weight.

A composite film was obtained in the same manner as in Example 1, except that the coating composition was applied to an inorganic layer so as to give the dried layer a thickness of 4.0 µm.

Examples 7 and 8

The following polyisocyanate compounds were employed as a component of the anchor coat composition instead of the polyisocyanate compound used in Example 1. Composite films were produced in the same manner as in Example 2.

Example 7

(B2) Polyisocyanate compound: Nippon Polyurethane Industries, Ltd., Colonate HL, an adduct of hexamethylenediisocyanatetrimethylolpropane; nonvolatile 75% by weight, isocyanate content 15%

Example 8

(B3) Polyisocyanate compound: Huels AG, Bestanate T1890L, a trimer of isophorone diisocyanate; nonvolatile 70% by weight, isocyanate content 12%

Example 9

Except for using the following anchor coat composition, a composite film provided with a 2.5-µm-thick barrier resin coating layer was obtained in the same manner as in Example 2.

Anchor coat composition (on a dry matter basis):
(A1) 100 parts by weight of the vinyl chloride-series copolymer of Example 1
(B1) 45 parts by weight of the polyisocyanate compound of Example 1
(C) 9 parts by weight of the saturated polyester resin of Example 1

Example 10

Except for using the following anchor coat composition, a composite film with a 2.5-µm-thick barrier resin coating layer was obtained in the same manner as in Example 2.

Anchor coat composition (on a dry matter basis):
(A2) 100 parts by weight of a vinyl chloride-series copolymer (Denki Kagaku Kogyo Co., Ltd., Denka 1000CM, a vinyl chloride-vinyl acetate-maleic acid copolymer; chlorine content 48.8%, average polymerisation degree 430, glass transition temperature 43° C., acid value derived from maleic acid about 10 mg KOH/g)
(B1) 150 parts by weight of the polyisocyanate compound of Example 1
(C) 22.5 parts by weight of the saturated polyester resin of Example 1

Example 11

To 100 parts by weight of a vinylidene chloride-series copolymer (Trade name: Saran Resin F 216; Asahi Chemical Industry Co., Ltd.) was added 0.2 part by weight of γ-glycidoxypropyltrimethoxysilane (i.e. 3-glycidyloxypropyltrimethoxysilane) (Trade name: TSL 8350; Toshiba Silicone Co., Ltd.). The mixture was dissolved in a mixed solvent of toluene/tetrahydrofuran (1/2 by weight) to give a coating composition for a barrier resin layer with a resin concentration of 15% by weight.

A composite film was produced in the same manner as in Example 1, except that the application of the coating composition provided a dry coating layer with a thickness of 2.5 µm on an inorganic layer.

Example 12

To 100 parts by weight of a vinylidene chloride-series copolymer (Trade name: Saran Resin F 216, manufactured by Asahi Chemical Industry Co., Ltd.) was added 5.0 parts by weight of γ-glycidoxypropyltrimethoxysilane (i.e. 3-glycidyloxypropyltrimethoxysilane) (Trade name: TSL 8350, manufactured by Toshiba Silicone Co., Ltd.). The mixture was dissolved in a mixed solvent of toluene/tetrahydrofuran (1/2 by weight) to give a coating composition for a barrier resin layer with a resin concentration of 15% by weight.

A composite film was provided in the same manner as in Example 1, except that the dry layer of the coating composition formed on an inorganic layer had a thickness of 2.5 µm.

Example 13

Except for using the following anchor coat composition, a composite film with a 2.5-µm-thick barrier resin coating layer was obtained in the same manner as in Example 2.

Anchor coat composition (on a dry matter basis):
(A1) 100 parts by weight of the vinyl chloride-series copolymer of Example 1
(B1) 60 parts by weight of the polyisocyanate compound of Example 1

Example 14

Except for using the following anchor coat composition, a composite film with a 2.5-µm-thick barrier resin coating layer was obtained in the same manner as in Example 2.

Anchor coat composition (on a dry matter basis):
(B1) 60 parts by weight of the polyisocyanate compound of Example 1
(C) 9 parts by weight of the saturated polyester resin of Example 1

Example 15

A composite film was produced in the same manner as in Example 1, except for applying the coating composition of Example 1 to an inorganic layer in order to give a 5-µm-thick dry layer.

Example 16

A composite film was obtained in the same manner as in Example 1, except for applying the coating composition of Example 1 onto an inorganic layer to give a dry layer a thickness of 10 µm.

Example 17

Except for using $Al_2O_3$ in place of SiO as a vapour source and forming an aluminium oxide vapour-deposited inorganic layer in a thickness of 1,000 Å by vacuum depositing

Example 18

A composite film was produced in the same manner as in Example 2, except for using a biaxially oriented nylon 6 film (NY), 15 μm in thickness, instead of the polyethylene terephthalate film (PET).

Example 19

A composite film was produced in the same manner as in Example 2, except for using a biaxially oriented polypropylene film (OPP), 20 μm in thickness, instead of the polyethylene terephthalate film (PET).

Comparative Example 1

On one side of a 12-μm-thick biaxially oriented polyethylene terephthalate film, silicon oxide vapour-deposited layer was deposited as an inorganic layer in a thickness of 500 Å by vapour depositing under a vacuum of $5 \times 10^{-3}$ Torr using SiO as a vapour source to give a composite film.

Comparative Example 2

Without using a silane coupling agent, a composite film was obtained in the same manner as in Example 1.

Comparative Example 3

Without using a silane coupling agent, a composite film was obtained in the same manner as in Example 2.

Comparative Example 4

Except for using the following anchor coat composition and applying the coating composition prepared in Example 1 to form a dry layer of 2.0 μm, a composite film provided with a barrier resin coating layer was obtained in the same manner as in Example 1.

Anchor coat composition (on dry matter basis):
(A1) 100 parts by weight of the vinyl chloride-series copolymer of Example 1
(C) 9 parts by weight of the saturated polyester of Example 1

Comparative Examples 5 and 6

Composite films were produced in the same manner as in Example 2, except for using the following two-component curable polyurethane adhesives in place of the anchor coat composition of Example 1.

Comparative Example 5

Two-component curable polyurethane adhesive (AC1); an anchor coat composition comprising (i) a polyether polyol (Toyo Morton Co., Ltd., Adcoat AD76H5, hydroxyl value 38 mg KOH/g, glass transition temperature 20° C.) and (ii) a polyisocyanate component (Toyo Morton Co., Ltd., CAT-10)

Comparative Example 6

Two-component curable polyurethane adhesive (AC2); an anchor coat composition comprising (i) 100 parts by weight of a polyester polyol (Toyo Morton Co., Ltd., Adcoat AD335AE, hydroxyl value 85 mg KOH/g, glass transition temperature −15° C.) and (ii) 5 parts by weight of a polyisocyanate component (Toyo Morton Co., Ltd., CAT-10)

Comparative Example 7

A coating composition with a resin concentration of 15% by weight was prepared by adding 1.0 part by weight of γ-glycidoxypropyltrimethoxysilane (Trade name: TSL 8350; Toshiba Silicone Co., Ltd.) to 100 parts by weight of a vinyl chloride-series copolymer (abbreviated to "PVC" in Table 2) used as the anchor coat component in Example 1 (Denki Kagaku Kogyo Co., Ltd., Denka 1000C: a resin which does not own the barrier properties as defined in this specification), and dissolving the mixture in a mixed solvent of toluene/tetrahydrofuran (1/2 by weight).

A composite film was produced by applying the obtained coating composition onto an inorganic layer so that a dry coating layer has a thickness of 2.5 μm.

Comparative Example 8

A coating composition with a 15-weight-percent resin concentration was prepared by adding 1.0 part by weight of the polyisocyanate compound used in Example 1 as a component of the anchor coat composition to 100 parts by weight of the vinylidene chloride copolymer used in Example 1 as a component of the coating composition, and dissolving the resultant mixture in a mixed solvent of toluene/tetrahydrofuran (1/2 by weight).

A composite film was produced in the same manner as in Example 1, except for applying the coating composition on an inorganic layer to give a 2.5-μm-thick dry layer.

Oxygen gas permeabilities and waver-vapour permeabilities of the composite films obtained in Examples and Comparative Examples were measured under the following conditions. In order to evaluate the change in gas barrier properties due to external mechanical force, oxygen gas permeabilities and water-vapour permeabilities were also measured after the films were crumpled once by hand.

Oxygen Gas Permeability

The values were measured by the isobaric method (instrument: Morcon's OXYTRAN TWIN) at 20° C., 65% R.H., expressed in a unit of $cc/m^2 \cdot 24$ hr.

Water-Vapour Permeability

The values were measured by means of an instrument (Morcon's PERMATRAN W 200) at 40° C., 90% R.H., expressed in a unit of $g/m^2 \cdot 24$ hr.

For preparation of a test sample, a heat-sealing layer was provided on the coating layer by the dry lamination method. The heat-sealing layer was formed by applying a laminating adhesive (Toyo Morton Co., Ltd., Adcoat AD-810/CAT-RT8, a two-component curable polyurethane-series adhesive) on the coating layer in such a way as to form a dried layer of about 2 μm, and thereon pasting a sealant (Cenesea C153#40; Daicel Chemical Industries, Co., Ltd., thickness 40 μm).

Adhesive strength, oxygen gas permeability and water-vapour permeability of each test sample were measured before and after 30-minute retort treatment.

The results are given in Tables 1 to 4.

TABLE 1

| | Base film | Elastic modulus of anchor coat layer (N/mm$^2$) | Inorganic Layer Species | Inorganic Layer Thickness (Å) | Barrier Resin Layer Species | Barrier Resin Layer Amount (%) of Coupling agent | Barrier Resin Layer Thickness (μm) | Oxygen permeability (cc/m$^2$ · 24 hrs) Before crumpled | Oxygen permeability (cc/m$^2$ · 24 hrs) After crumpled | Water-vapour permeability (g/m$^2$ · 24 hrs) Before crumpled | Water-vapour permeability (g/m$^2$ · 24 hrs) After crumpled |
|---|---|---|---|---|---|---|---|---|---|---|---|
| Example 1 | PET | $5.2 \times 10^1$ | SiO | 500 | PVDC | 1.0 | 0.5 | 0.06 | 0.1 | 0.6 | 1.8 |
| Example 2 | PET | $5.2 \times 10^1$ | SiO | 500 | PVDC | 1.0 | 2.5 | 0.01 | 0.3 | 0.3 | 1.6 |
| Example 3 | PET | $5.2 \times 10^1$ | SiO | 500 | PVDC | 1.0 | 2.5 | 0.02 | 0.3 | 0.3 | 1.7 |
| Example 4 | PET | $5.2 \times 10^1$ | SiO | 500 | PVDC | 1.0 | 2.5 | 0.02 | 0.3 | 0.3 | 1.9 |
| Example 5 | PET | $5.2 \times 10^1$ | SiO | 500 | PVDC | 1.0 | 2.5 | 0.02 | 0.3 | 0.5 | 2.0 |
| Example 6 | PET | $5.2 \times 10^1$ | SiO | 500 | EVOH | 1.0 | 4.0 | <0.01 | 0.3 | 0.9 | 2.3 |
| Example 7 | PET | $3.1 \times 10^1$ | SiO | 500 | PVDC | 1.0 | 2.5 | 0.1 | 0.3 | 0.3 | 0.5 |
| Example 8 | PET | $5.3 \times 10^1$ | SiO | 500 | PVDC | 1.0 | 2.5 | 0.2 | 0.5 | 0.4 | 0.8 |
| Example 9 | PET | $4.8 \times 10^1$ | SiO | 500 | PVDC | 1.0 | 2.5 | 0.1 | 0.3 | 0.7 | 1.9 |
| Example 10 | PET | $4.8 \times 10^1$ | SiO | 500 | PVDC | 1.0 | 2.5 | 0.2 | 0.6 | 0.8 | 2.0 |
| Example 11 | PET | $5.2 \times 10^1$ | SiO | 500 | PVDC | 0.2 | 2.5 | 0.04 | 0.4 | 0.3 | 2.0 |
| Example 12 | PET | $5.2 \times 10^1$ | SiO | 500 | PVDC | 5.0 | 2.5 | 0.06 | 0.5 | 0.4 | 2.4 |
| Example 13 | PET | $2.6 \times 10^1$ | SiO | 500 | PVDC | 1.0 | 2.5 | 0.3 | 0.7 | 0.6 | 1.1 |
| Example 14 | PET | $4.0 \times 10^1$ | SiO | 500 | PVDC | 1.0 | 2.5 | 0.8 | 1.3 | 2.3 | 3.4 |

PET: polyethylene terephthalate,
NY: nylon,
OPP: polypropylene,
PVDC: vinylidene chloride-series copolymer,
EVOH: ethylene-vinyl alcohol opolymer

TABLE 2

| | Base film | Elastic modulus of anchor coat layer (N/mm$^2$) | Inorganic Layer Species | Inorganic Layer Thickness (Å) | Barrier Resin Layer Species | Barrier Resin Layer Amount (%) of Coupling agent | Barrier Resin Layer Thickness (μm) |
|---|---|---|---|---|---|---|---|
| Example 15 | PET | $5.2 \times 10^1$ | SiO | 500 | PVDC | 1.0 | 5.0 |
| Example 16 | PET | $5.2 \times 10^1$ | SiO | 500 | PVDC | 1.0 | 10 |
| Example 17 | PET | $5.2 \times 10^1$ | Al$_2$O$_3$ | 1,000 | PVDC | 1.0 | 2.5 |
| Example 18 | NY | $5.2 \times 10^1$ | SiO | 500 | PVDC | 1.0 | 2.5 |
| Example 19 | OPP | $5.2 \times 10^1$ | SiO | 500 | PVDC | 1.0 | 2.5 |
| Comp.Ex. 1 | PET | — | SiO | 500 | — | — | — |
| Comp.Ex. 2 | PET | $5.2 \times 10^1$ | SiO | 500 | PVDC | — | 0.5 |
| Comp.Ex. 3 | PET | $5.2 \times 10^1$ | SiO | 500 | PVDC | — | 2.5 |
| Comp.Ex. 4 | PET | — | SiO | 500 | PVDC | 1.0 | 2.0 |
| Comp.Ex. 5 | PET | AC1* | SiO | 500 | PVDC | 1.0 | 2.5 |
| Comp.Ex. 6 | PET | AC2** | SiO | 500 | PVDC | 1.0 | 2.5 |
| Comp.Ex. 7 | PET | $5.2 \times 10^1$ | SiO | 500 | PVC | 1.0 | 2.5 |
| Comp.Ex. 8 | PET | $5.2 \times 10^1$ | SiO | 500 | PVDC | 1.0 | 2.5 |

| | Oxygen permeability (cc/m$^2$ · 24 hrs) Before crumpled | Oxygen permeability (cc/m$^2$ · 24 hrs) After crumpled | Water-vapour permeability (g/m$^2$ · 24 hrs) Before crumpled | Water-vapour permeability (g/m$^2$ · 24 hrs) After crumpled |
|---|---|---|---|---|
| Example 15 | <0.01 | 0.3 | 0.1 | 1.0 |
| Example 16 | <0.01 | 0.3 | 0.08 | 0.8 |
| Example 17 | 0.6 | 0.9 | 0.8 | 1.2 |
| Example 18 | 1.2 | 1.6 | 2.3 | 3.2 |
| Example 19 | 0.4 | 1.2 | 0.8 | 1.8 |

TABLE 2-continued

| | | | | |
|---|---|---|---|---|
| Comp.Ex. 1 | 2.3 | 15.2 | 2.8 | 16.0 |
| Comp.Ex. 2 | 0.03 | 0.6 | 0.2 | 3.6 |
| Comp.Ex. 3 | 0.01 | 0.7 | 0.6 | 1.8 |
| Comp.Ex. 4 | 0.3 | 0.4 | 0.4 | 2.0 |
| Comp.Ex. 5 | 1.3 | — | >20 | — |
| Comp.Ex. 6 | 0.3 | 2.3 | 0.6 | 2.8 |
| Comp.Ex. 7 | 2.3 | 4.8 | 2.3 | 5.6 |
| Comp.Ex. 8 | 0.03 | 0.3 | 0.6 | 2.3 |

PVC: vinyl chloride-series copolymer
AC1*: Two-component curable adhesive (AC1)
AC2**: Two-component curable adhesive (AC2)
Barrier resin layer of Comparative Example 8:
A polyisocyanate compound was employed instead of a silane coupling agent

TABLE 3

| | Before retort treatment | | | After retort treatment | | |
|---|---|---|---|---|---|---|
| | Adhesive strength (g/15 mm) | $O_2$-TR (cc/m$^2$ · 24 hrs) | WV-TR (g/m$^2$ · 24 hrs) | Adhesive strength (g/15 mm) | $O_2$-TR (cc/m$^2$ · 24 hrs) | WV-TR (g/m$^2$ · 24 hrs) |
| Example 1 | 320 | 0.1 | 0.3 | 280 | 0.7 | 2.3 |
| Example 2 | 250 | 0.04 | 0.3 | 290 | 0.6 | 1.2 |
| Example 3 | 260 | 0.03 | 0.3 | 270 | 0.7 | 1.3 |
| Example 4 | 200 | 0.03 | 0.3 | 230 | 0.8 | 1.3 |
| Example 5 | 240 | 0.03 | 0.4 | 210 | 0.7 | 1.5 |
| Example 6 | 230 | 0.03 | 0.5 | 200 | 1.3 | 2.8 |
| Example 7 | 380 | 0.1 | 0.3 | 420 | 0.3 | 0.8 |
| Example 8 | 420 | 0.2 | 0.4 | 520 | 0.3 | 0.9 |
| Example 9 | 170 | 0.1 | 0.8 | 150 | 0.8 | 1.9 |
| Example 10 | 180 | 0.4 | 0.6 | 170 | 1.0 | 2.8 |
| Example 11 | 250 | 0.1 | 0.4 | 210 | 0.7 | 1.8 |
| Example 12 | 230 | 0.1 | 0.5 | 190 | 0.6 | 1.7 |
| Example 13 | 290 | 0.3 | 0.6 | 265 | 3.9 | 6.3 |
| Example 14 | 280 | 0.8 | 2.3 | 90 | 3.1 | 6.8 |

$O_2$-TR: Oxygen gas permeability
WV-TR: Water-vapour permeability

TABLE 4

| | Before retort treatment | | | After retort treatment | | |
|---|---|---|---|---|---|---|
| | Adhesive strength (g/15 mm) | $O_2$-TR (cc/m$^2$ · 24 hrs) | WV-TR (g/m$^2$ · 24 hrs) | Adhesive strength (g/15 mm) | $O_2$-TR (cc/m$^2$ · 24 hrs) | WV-TR (g/m$^2$ · 24 hrs) |
| Example 15 | 230 | 0.04 | 0.3 | 210 | 0.4 | 1.8 |
| Example 16 | 240 | 0.03 | 0.2 | 200 | 0.3 | 1.4 |
| Example 17 | 180 | 0.6 | 0.8 | 230 | 1.7 | 2.1 |
| Example 18 | 250 | 1.2 | 2.3 | 280 | 2.4 | 2.9 |
| Example 19 | 230 | 0.4 | 0.8 | — | — | — |
| Comp.Ex. 1 | — | — | — | — | — | — |
| Comp.Ex. 2 | 150 | 0.2 | 0.4 | <10 | 0.7 | 5.6 |
| Comp.Ex. 3 | 210 | 0.1 | 0.3 | <10 | 0.6 | 3.6 |
| Comp.Ex. 4 | <10 | 0.2 | 0.4 | 25 | 3.4 | 9.4 |
| Comp.Ex. 5 | 210 | 10 | >20 | — | — | — |
| Comp.Ex. 6 | <10 | 0.6 | 0.7 | — | — | — |
| Comp.Ex. 7 | 150 | 1.8 | 1.8 | 10 | 6.8 | 10.6 |
| Comp.Ex. 8 | 210 | 0.1 | 0.4 | 10 | 2.8 | 6.4 |

$O_2$-TR: Oxygen gas permeability
WV-TR: Water-vapour permeability

Examples 20 to 25

Composite films were obtained in the same manner as in Example 2, except for using the anchor coat compositions comprising the components (A), (B) and (C) of Example 1 in proportions (parts by weight) shown below.

| | Component (A) | Component (B) | Component (C) |
|---|---|---|---|
| Example 20: | 100 | 30 | 9 |
| Example 21: | 100 | 60 | 6 |
| Example 22: | 100 | 60 | 3 |

-continued

|  | Component (A) | Component (B) | Component (C) |
|---|---|---|---|
| Example 23: | 100 | 75 | 11.3 |
| Example 24: | 100 | 150 | 22.5 |
| Example 25: | 100 | 300 | 45 |

Table 5 shows the characteristics of the composite films of Examples 20 to 25 as well as those of Examples 2 and 9.

TABLE 5

|  | Anchor coat composition | | | Elastic modulus of |
|---|---|---|---|---|
|  | Component (A) | Component (B) | Component (C) | anchor coat layer |
| Example 9 | 100 | 45 | 9 | $4.8 \times 10^1$ |
| Example 20 | 100 | 30 | 9 | $4.2 \times 10^1$ |
| Example 21 | 100 | 60 | 6 | $5.4 \times 10^1$ |
| Example 22 | 100 | 60 | 3 | $2.0 \times 10^2$ |
| Example 23 | 100 | 75 | 11.3 | $7.3 \times 10^1$ |
| Example 2 | 100 | 100 | 15 | $5.2 \times 10^1$ |
| Example 24 | 100 | 150 | 22.5 | $4.8 \times 10^1$ |
| Example 25 | 100 | 300 | 45 | $2.8 \times 10^2$ |

| | Before retort treatment | | | After retort treatment | | |
|---|---|---|---|---|---|---|
| | Adhesive strength (g/15 mm) | $O_2$-TR (cc/m² · 24 hrs) | WV-TR (g/m² · 24 hrs) | Adhesive strength (g/15 mm) | $O_2$-TR (cc/m² · 24 hrs) | WV-TR (g/m² · 24 hrs) |
| Example 9 | 405 | 0.1 | 0.8 | 235 | 3.2 | 8.2 |
| Example 20 | 375 | 0.5 | 1.2 | 195 | 3.0 | 7.4 |
| Example 21 | 375 | 0.1 | 0.3 | 260 | 0.8 | 1.8 |
| Example 22 | 325 | 0.8 | 1.4 | 260 | 4.8 | 7.3 |
| Example 23 | 370 | 0.2 | 0.4 | 255 | 4.4 | 8.2 |
| Example 2 | 315 | 0.1 | 0.3 | 290 | 0.8 | 1.3 |
| Example 24 | 315 | 0.2 | 0.5 | 230 | 0.5 | 0.7 |
| Example 25 | 220 | 2.0 | 4.8 | — | 3.3 | 7.3 |

$O_2$-TR: Oxygen gas permeability
WV-TR: Water-vapour permeability

What is claimed is:

1. A barrier composite film which comprises a base film layer, an anchor coat layer formed on at least one side of said base film, an inorganic layer has a thickness of 100 to 5,000 Å formed on said anchor coat layer, and a barrier resin layer containing a silane coupling agent and formed on said inorganic layer.

2. A barrier composite film as claimed in claim 1, wherein said base film layer comprises any of a polypropylene, a polyalkylene terephthalate or a polyamide.

3. A barrier composite film as claimed in claim 1, wherein said anchor coat layer comprises (i) an anchor coat composition containing at least a chlorine-containing resin, or (ii) an anchor coat composition containing a polyisocyanate compound, and at least one resin selected from the group consisting of a chlorine-containing resin and a saturated polyester resin.

4. A barrier composite film as claimed in claim 1, wherein said anchor coat layer comprises (A) a chlorine-containing resin, (B) a polyisocyanate compound, and (C) a saturated polyester resin having a glass transition temperature of −10° C. to 20° C. and being substantially unreactive to the polyisocyanate compound.

5. A barrier composite film as claimed in claim 3, wherein said chlorine-containing resin is a vinyl chloride-vinyl acetate-series copolymer comprising at least vinyl chloride and vinyl acetate as monomer components.

6. A barrier composite film as claimed in claim 3, wherein said polyisocyanate compound (B) is a compound having at least two isocyanate groups per molecule with a molecular weight of 150 to 1,000.

7. A barrier composite film as claimed in claim 3, wherein said saturated polyester resin (C) is a noncrystalline saturated polyester with a hydroxy value of 0 to 15 mg KOH/g or an acid value of 0 to 10 mg KOH/g.

8. A barrier composite film as claimed in claim 3, wherein the number average molecular weight of the saturated polyester resin (C) is $1 \times 10^4$ to $5 \times 10^4$.

9. A barrier composite film as claimed in claim 3, wherein said anchor coat layer comprises 10 to 500 parts by weight of the polyisocyanate compound (B) and 1 to 50 parts by weight of the saturated polyester resin (C), relative to 100 parts by weight of the chlorine-containing resin (A).

10. A barrier composite film as claimed in claim 1, wherein said anchor coat layer comprises 25 to 400 parts by weight of a polyisocyanate compound (B) having three or more isocyanate groups per molecule with a molecular weight of 150 to 1,000, and 2 to 50 parts by weight of a noncrystalline saturated polyester resin (C) having a glass transition temperature of 0 to 20° C., a number average molecular weight of $1 \times 10^4$ to $3 \times 10^4$, and a hydroxyl value of 0 to 10 mg KOH/g or an acid value of 0 to 10 mg KOH/g, relative to 100 parts by weight of a noncrystalline thermoplastic chlorine-containing resin (A) having a glass transition temperature of 25 to 60° C. and an acid value of 0 to 30 mg KOH/g.

11. A barrier composite film as claimed in claim 1, wherein said inorganic layer is formed with at least one oxide of a metal selected from the group consisting of Group 2A elements, transition elements, Group 2B elements, Group 3B elements, Group 4B elements and Group 6B elements of the Periodic Table of the Elements.

12. A barrier composite film as claimed in claim 1, wherein said inorganic layer is formed with an oxide of a Group 3B element or a Group 4B element of the Periodic Table of the Elements.

13. A barrier composite film as claimed in claim 1, wherein said inorganic layer has a thickness of 100 to 5,000 Å.

14. A barrier composite film as claimed in claim 1, wherein said barrier resin layer comprises a vinylidene chloride-series copolymer or an ethylene-vinyl alcohol copolymer.

15. A barrier composite film as claimed in claim 1, wherein said silane coupling agent has at least one functional group selected from the group consisting of a halogen atom, an epoxy group, an amino group, a hydroxyl group, a mercapto group, a carboxyl group, a vinyl group and a (meth)acryloyl group, as well as an alkoxy group.

16. A barrier composite film as claimed in claim 1, wherein said silane coupling agent is a compound shown by the following formula,

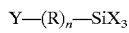

Y—(R)$_n$—SiX$_3$ wherein Y is a functional group selected from the group consisting of a halogen atom, an epoxy group, an amino group, a mercapto group, a carboxyl group, a vinyl group and a (meth)acryloyl group; R represents a hydrocarbon residue; and X indicates the same or different alkoxy group, n denoting 0 or 1.

17. A barrier composite film as claimed in claim 16, wherein the hydrocarbon residue shown by R is a $C_{1-4}$ alkylene group, or a $C_{5-8}$ cycloalkene-$C_{1-4}$ alkyl residue, the double bond of the said cycloalkene being epoxidated, and wherein X is the same or different methoxy group or ethoxy group.

18. A barrier composite film as claimed in claim 1, wherein the proportion of the silane coupling agent is 0.05 to 10 parts by weight relative to 100 parts by weight of the barrier resin.

19. A barrier composite film as claimed in claim 1, wherein the thickness of the barrier resin layer is 0.05 to 15 μm.

20. A barrier composite film as claimed in claim 1, wherein a ratio T/t of the thickness T (μm) of the barrier resin layer relative to the thickness t (μm) of the inorganic layer is 0.1 to 1,500.

21. A barrier composite film as claimed in claim 1, wherein said film comprises:
   a base film layer made of a polypropylene, a polyalkylene terephthalate or a polyamide,
   an anchor coat layer containing (i) at least a chlorine-containing resin, or (ii) a polyisocyanate compound, and either of a chlorine-containing resin or a saturated polyester resin or both of them,
   an inorganic layer composed of a metal oxide and having transparency, and
   a barrier resin layer comprising a silane coupling agent, and either of a vinylidene chloride-series copolymer or an ethylene-vinyl alcohol copolymer,
   said layers being formed in that order on at least one side of said base film layer.

22. A barrier composite film comprising a base film layer, an anchor coat layer formed on at least one side of said base film layer, an inorganic oxide thin layer formed on the anchor coat layer, and a barrier resin layer formed on the inorganic oxide layer has a thickness of 100 to 5,000 Å, wherein the elastic modulus of said anchor coat layer is $0.1 \times 10^1$ to $1 \times 10^3$ N/mm$^2$.

23. A barrier composite film comprising a base film layer, an anchor coat layer formed on at least one side of said base film layer, an inorganic oxide thin layer formed on the anchor coat layer, and a barrier resin layer formed on the inorganic oxide layer has a thickness of 100 to 5,000 Å, wherein said barrier resin layer has a peeling strength of not lower than 100 g/15 mm for the base film layer as measured after 30 minutes of retort treatment at a temperature of 120° C.

24. A barrier composite film as claimed in claim 23, wherein said composite film has an oxygen gas permeability of not higher than 2 cc/m$^2$·24 hr. and a water vapour permeability of not higher than 3 g/m$^2$·24 hr. after 30 minutes of retort treatment at 120° C., provided that the base film layer has a thickness of 10 to 30 μm and that the coating layer comprising the anchor coat layer, the inorganic layer and the barrier resin layer has a thickness of 0.5 to 5 μm.

25. A barrier composite film as claimed in claim 23, wherein said composite film has an oxygen gas permeability of not higher than 1 cc/m$^2$·24 hr. at 25° C., and a water vapour permeability of not higher than 3 g/m$^2$·24 hr. at 40° C. and 90% R.H., provided that the base film layer has a thickness of 10 to 30 μm and that the covering or coating layer comprising the anchor coat layer, the inorganic layer and the barrier resin layer has a thickness of 0.5 to 5 μm.

26. A barrier composite film as claimed in claim 23, wherein said anchor coat layer comprises (A) a chlorine-containing resin, (B) a polyisocyanate compound, and (C) a substantially unreactive saturated polyester resin with a glass transition temperature of −10° C. to 20° C., and is formed with a resin composition having an elastic modulus of $1 \times 10^1$ to $5 \times 10^2$ N/mm$^2$.

27. A barrier composite film as claimed in claim 1, wherein the other side of the base film layer or the surface of the barrier resin layer is covered with a polymer layer.

28. A barrier composite film as claimed in claim 27, wherein said polymer layer is a heat-sealing layer.

29. A process for producing a barrier composite film which comprises forming an anchor coat layer, an inorganic layer has a thickness of 100 to 5,000 Å, and a barrier resin layer containing a silane coupling agent on at least one side of a base film in the order of reference.

* * * * *